(No Model.)  J. B. G. A. CANET.  5 Sheets—Sheet 1.
BREECH LOADING ORNDANCE.
No. 430,102.  Patented June 10, 1890.

(No Model.) 5 Sheets—Sheet 3.
J. B. G. A. CANET.
BREECH LOADING ORNDANCE.

No. 430,102. Patented June 10, 1890.

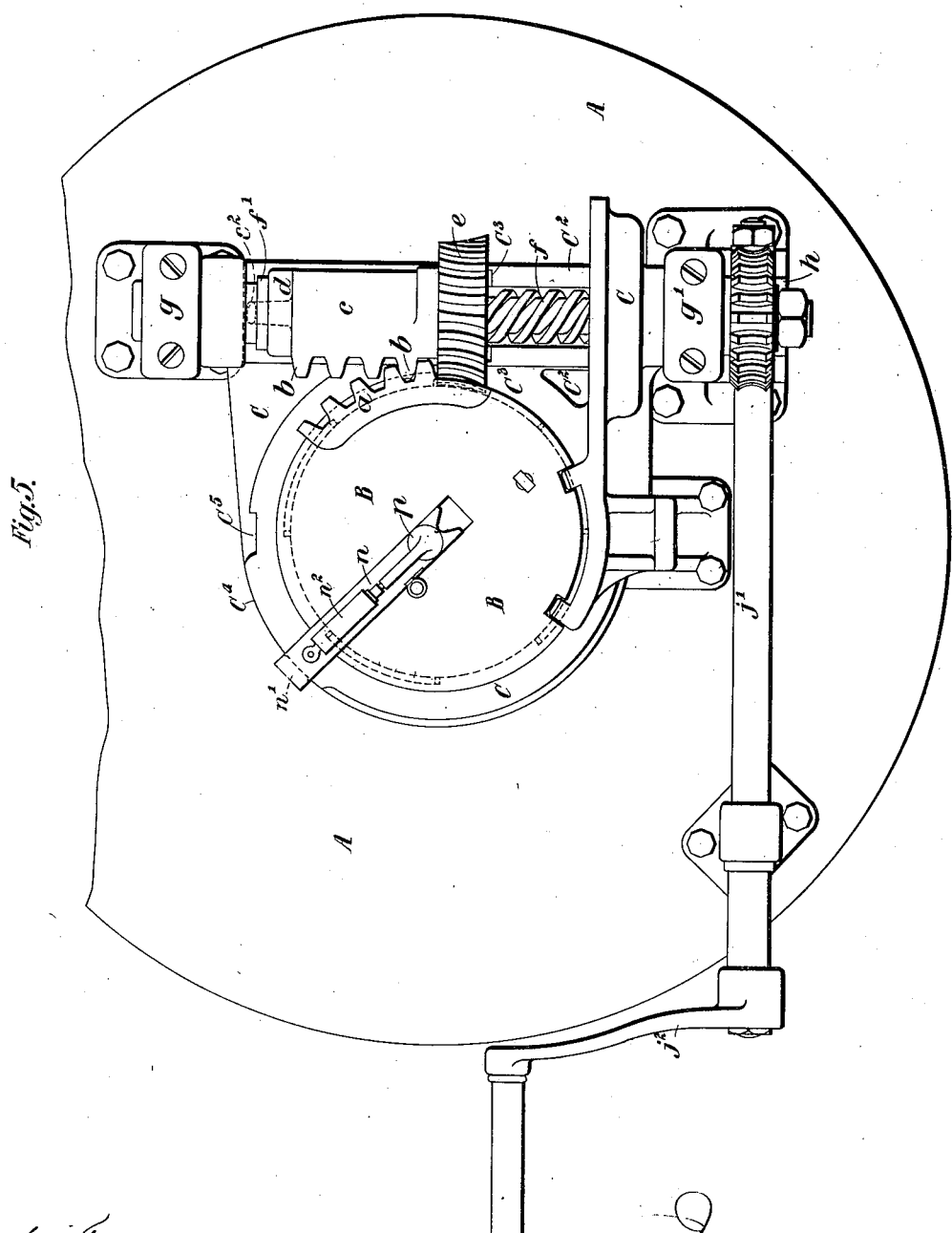

(No Model.) 5 Sheets—Sheet 5.
J. B. G. A. CANET.
BREECH LOADING ORNDANCE.
No. 430,102. Patented June 10, 1890.
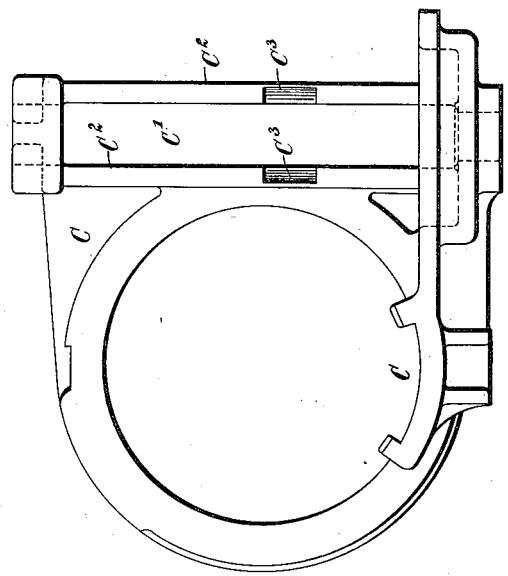
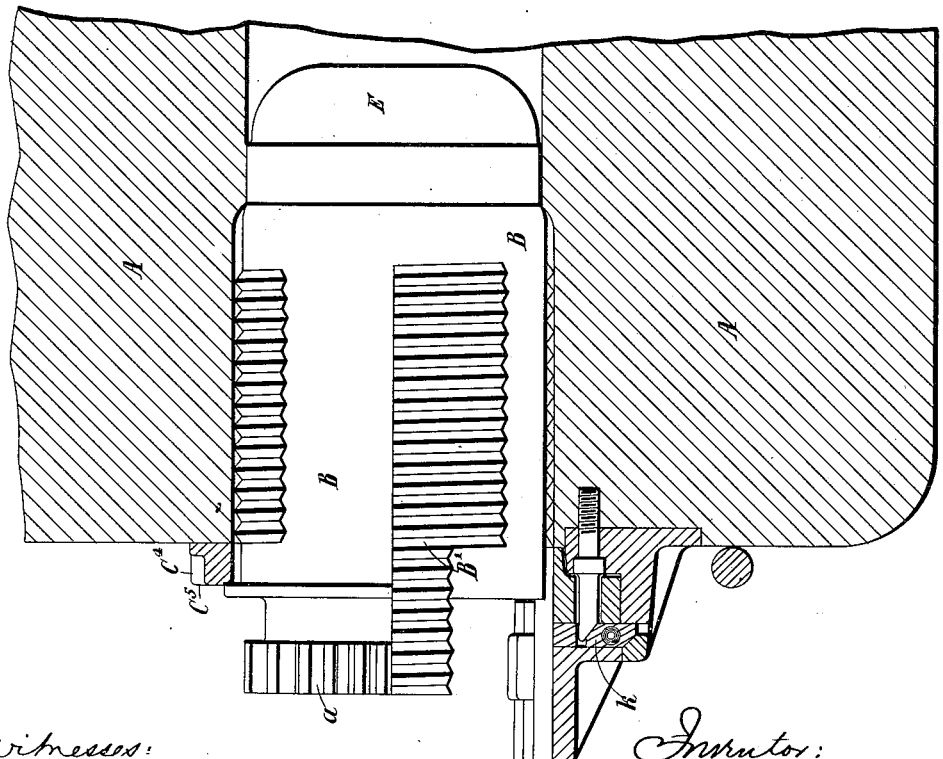

UNITED STATES PATENT OFFICE.

JEAN BAPTISTE GUSTAVE ADOLPHE CANET, OF PARIS, FRANCE, ASSIGNOR OF ONE-HALF TO SIR JOSEPH WHITWORTH & COMPANY, (LIMITED,) OF OPENSHAW, ENGLAND.

BREECH-LOADING ORDNANCE.

SPECIFICATION forming part of Letters Patent No. 430,102, dated June 10, 1890.

Application filed April 23, 1889. Serial No. 308,296. (No model.) Patented in France June 7, 1887, No. 184,079.

*To all whom it may concern:*

Be it known that I, JEAN BAPTISTE GUSTAVE ADOLPHE CANET, engineer, a citizen of the Republic of France, and a resident of Paris, France, have invented certain new and useful Improvements in Breech-Loading Ordnance, (for which I have obtained a patent in France, certificate of addition, dated June 4, 1888, to Patent No. 184,079, dated June 7, 1887,) of which the following is a specification, reference being had to the accompanying drawings.

My invention relates to breech-loading ordnance, and comprises improved means for opening and closing the breech of guns in which the breech-screw or breech-plug is made with interrupted screw-threads. It also comprises other improvements in the breech mechanism.

One feature of my said invention is the provision of mechanism whereby the breech may be completely opened by the continuous rotation of a crank-handle or its equivalent in one direction and may be closed by the continuous rotation thereof in the reverse direction.

Another feature of my said invention is the construction of the breech-screw with a fixed stem and a movable head, as hereinafter described.

My said invention also comprises novel means for automatically effecting the cocking of the hammer and the extraction of the empty fuse-cases.

In the accompanying drawings I have shown how my said invention may be conveniently and advantageously carried into practice.

Figure 1:
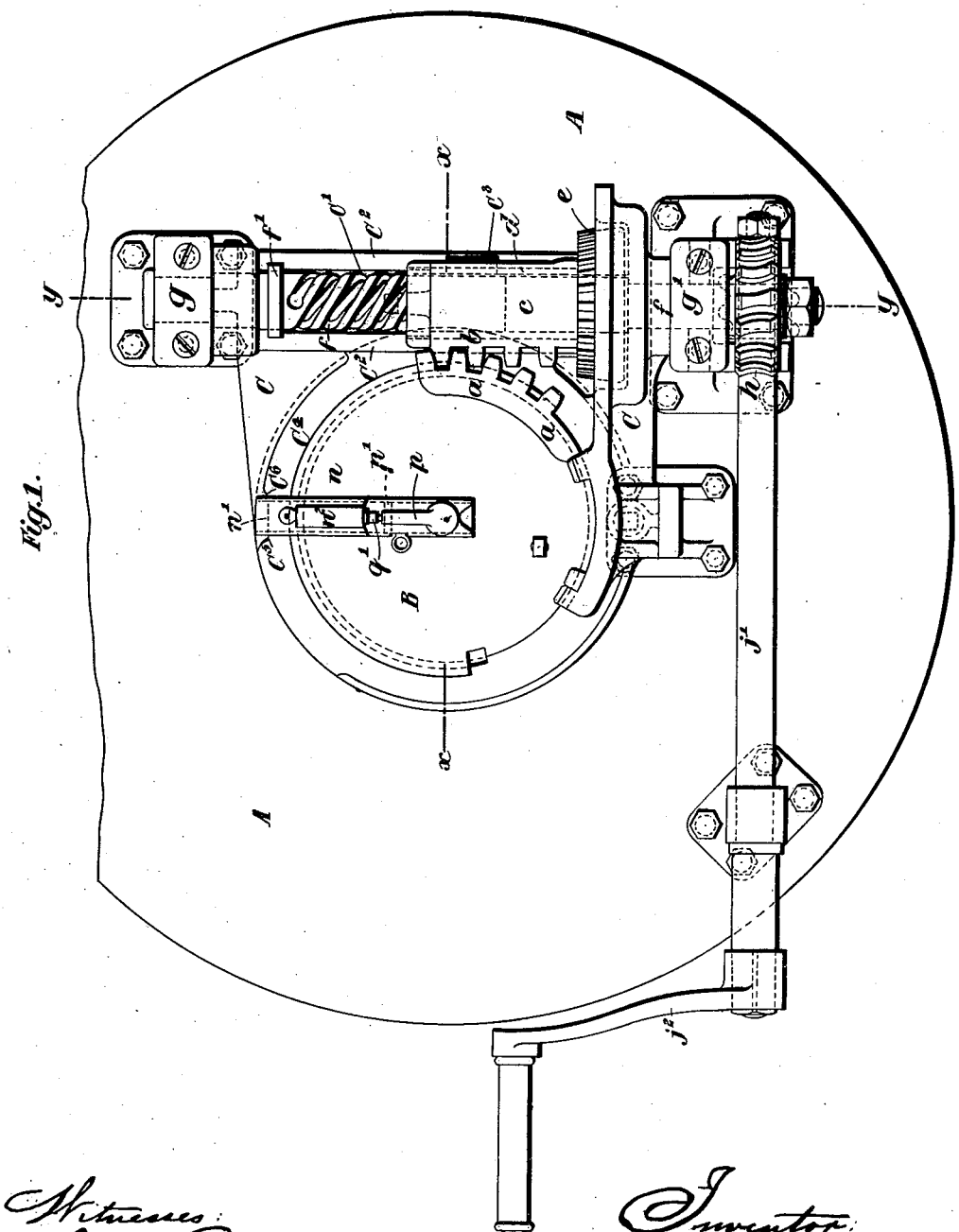
Figure 2:
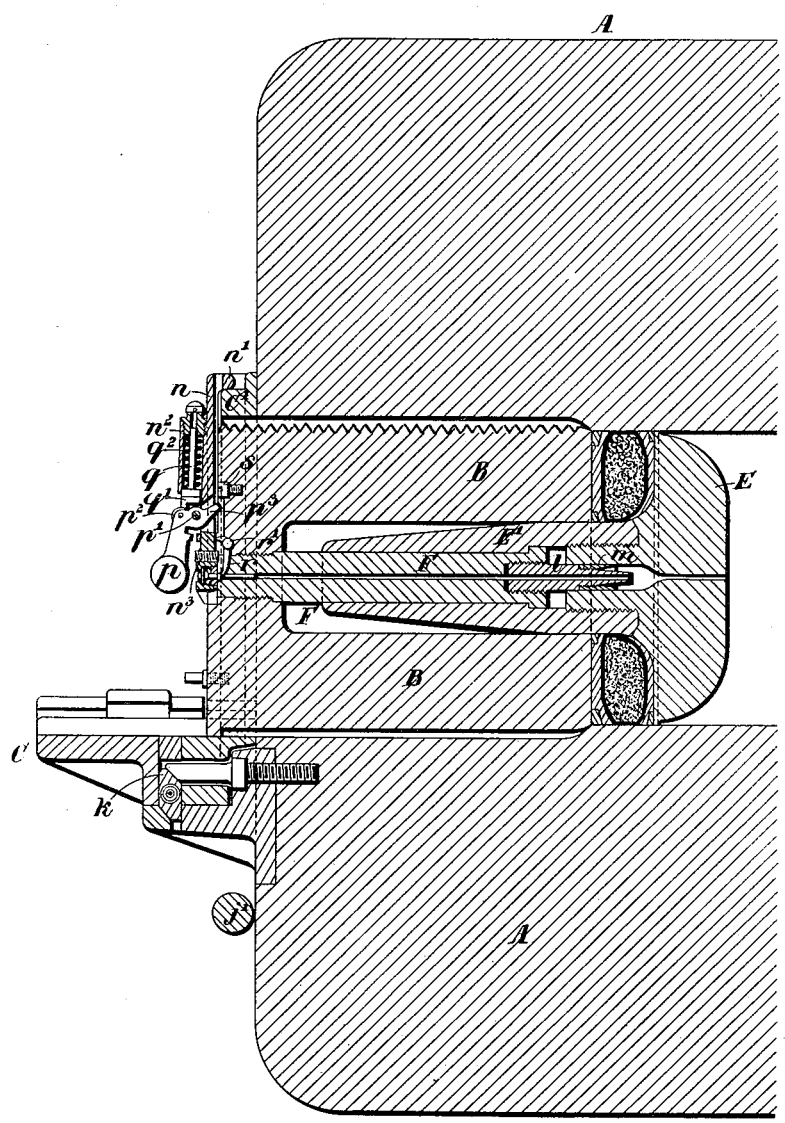
Figure 3:
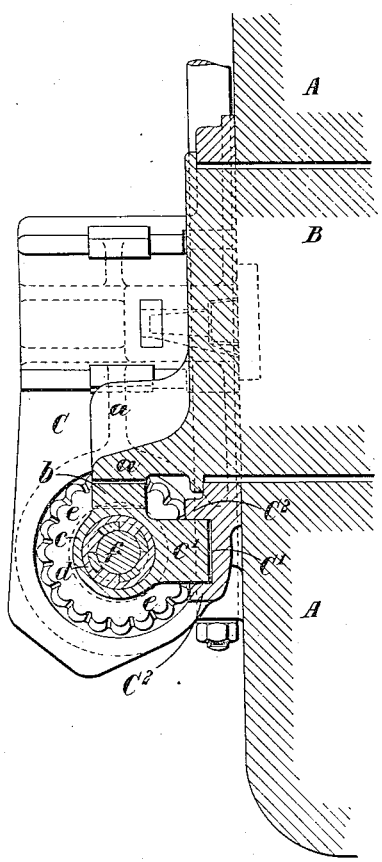
Figure 4:
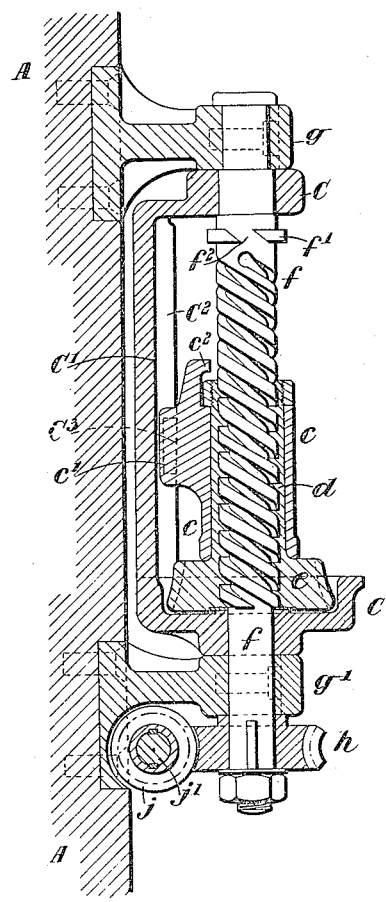

Figure 1 is a rear elevation, and Fig. 2 a vertical longitudinal central section of the breech end of a gun with my improvements applied thereto. Fig. 3 is a plan, partly in horizontal section, on the line $x$ $x$, Fig. 1. Fig. 4 is a vertical section on the line $y$ $y$, Fig. 1. Fig. 5 is a rear elevation, and Fig. 6 a vertical longitudinal central section, the breech-screw being shown in side elevation, showing the parts in the positions which they occupy when the breech-screw has been turned about its axis to disengage it from the screw-threads in the breech of the gun; and Fig. 7 is a rear elevation of a portion of the breech mechanism detached.

Like letters indicate corresponding parts throughout the drawings.

A is the barrel or body of the gun.

B is the breech-screw, which is provided with interrupted or segmental screw-threads B'.

C is the bracket for supporting the breech-screw when out of the breech.

$a$ is a toothed segment, which is formed on or firmly attached to the rear end of the breech-screw, and is geared with a rack $b$, formed on a collar or sleeve $c$, in which is arranged to turn with a slight amount of friction a nut $d$, formed with or rigidly attached to a toothed wheel $e$. The said nut $d$ works on a strong screw-shaft $f$, supported at its extremities in bearings $g$ $g'$, suitably attached to the breech end of the gun. The teeth of the wheel $e$ are helical, and are so formed as to be capable of engaging with the interrupted screw-threads B' of the breech-screw.

A worm-wheel $h$ is fixed upon the lower extremity of the screw-shaft $f$ and is geared with an endless screw or worm $j$, fixed on a horizontal shaft $j'$, supported in suitable bearings attached to the breech end of the gun and provided with a crank-handle $j^2$, whereby it may be rotated by hand. This hand-gear for operating the screw-shaft $f$ may, if desired, be dispensed with and hydraulic or other suitable motor apparatus employed instead thereof. The bracket C, which supports the breech-screw when out of the breech, is fitted on the shaft $f$, so that it is capable of turning or swinging about the axis of the said shaft.

The operation of the mechanism above described is as follows, viz: When the shaft $j'$ is rotated, motion is communicated through the worm $j$ to the worm-wheel $h$, thus rotating the screw-shaft $f$. The collar or sleeve $c$ and the toothed wheel $e$ are meanwhile prevented from rotation—the collar or sleeve $c$ by a projection $c'$ thereon working in a vertical groove C' in the bracket C, and the toothed wheel $e$ by reason of the engagement of two of its teeth with ribs or projections $C^2$ on the bracket C, as indicated more clearly in Figs. 3 and 4. The nut $d$ with the toothed wheel $e$ and collar or sleeve $c$ therefore rise on the screw-shaft $f$, and the rack $b$, acting upon the toothed segment $a$, turns the breech-screw B about its axis. When the breech-screw has been rotated sufficiently to disengage it from the screw-threads in the breech of the gun, a projecting finger $c^2$ on the sleeve $c$ passes through an opening or slot $f^2$ in a collar $f'$, formed on the screw-shaft $f$, and the upper end of the nut $d$ abuts against the said collar $f'$, thus preventing further translatory movement of the said nut. By the said upward movement of the sleeve $c$, nut $d$, and toothed wheel $e$ the said toothed wheel is brought into gear with the threads B' of the breech-screw and level with notches $C^3$ in the projections $C^2$ of the bracket C, so that rotation of the said wheel is no longer prevented. In the continued rotation of the screw-shaft $f$, the wheel $e$ moves with the said shaft, and by reason of the engagement of the said wheel with the threads of the breech-screw effects the withdrawal of the breech-screw from the breech. When the breech-screw has arrived at the rear end of its movement, a latch $k$, similar to that described in my application for Letters Patent of the United States, filed on the 17th of April, 1889, Serial No. 307,567, locks the said breech-screw to the bracket C. In this case, however, the said latch is placed beneath the bracket instead of at the side thereof. The continued rotation of shaft $f$ and wheel $e$ then causes the whole device, comprising the breech-screw B and bracket C, to turn or swing about the axis of the said shaft, thus moving aside the said breech-screw and bracket to permit the insertion of a fresh charge in the gun.

The operations above described are reversed in closing the breech, and during the reverse movement of the screw-shaft $f$ the finger $c^2$, which rests on the upper side of the collar $f'$, prevents the descent of the nut $d$ until the opening or slot $f^2$ in the said collar $f'$ arrives beneath the said finger, and this takes place at the termination of the inward movement of the breech-screw, thus permitting the turning of the said breech-screw about its axis to effect its engagement with the screw-threads in the breech of the gun.

In the breech-piece the rod or stem F, instead of being movable, as heretofore, is screwed firmly into the rear end of the breech-screw B. The movable head is formed in two parts—viz., a disk E and a sleeve E'—which are firmly screwed together. The sleeve E' is fitted upon the fixed rod or stem F, so that it can slide thereon when the powder-gases act upon it.

At the extremity of the fixed rod or stem F is a nozzle $l$, provided with a metal tube $m$, the extremity of which is cut away or beveled internally, and which bears against the wall of the central passage through the movable head, and under the expansive action of the gas effects a complete obturation of the said passage.

The rod or stem F being fixed, I am enabled to form the sliding bolt $n$ of the firing mechanism in one piece and to improve the said firing mechanism as follows, that is to say: The said bolt $n$ is provided with a projection $n'$, which bears against the exterior edge of the rim $C^4$ of the bracket $c$. The shape of this rim is such that the bolt will be moved into the required position for firing when, but not until, the breech is completely closed, in which position the projection $n'$ is opposite a notch or recess $C^5$, formed in the said rim $C^4$, which permits the falling of the said bolt. The said bolt is combined with an automatic cocking and extracting device, as follows, viz: The firing-hammer $p$ is pivoted at $p'$ to the bolt $n$ and is provided with a roller $p^2$, against which presses the head $q'$ of a rod $q$. The said rod $q$ is acted upon by a spring $q^2$, inclosed in a casing $n^2$ on the bolt $n$. The hammer is, moreover, provided with an arm or extension $p^3$. An extractor-lever $r$ is pivoted at $r'$ to the breech-screw, and is arranged to be operated in the upward movement of the bolt $n$ by a stud or projection $n^3$ on the said bolt to effect the extraction of the empty fuse-case. The operation of this mechanism is as follows: When, after firing, the breech is opened, the projection $n'$ of the bolt $n$ rises upon the inclined surface $C^6$ on the rim $C^4$, carrying with it the said bolt and the firing-hammer. The extension $p^3$ of the hammer in rising strikes a stop $s$, fixed in the breech-screw, and the hammer is thus cocked. At the same time the stud or projection $n^3$ on the bolt $n$ comes in contact with the short arm of the extractor $r$ and turns the latter suddenly about its pivot $r'$, thus ejecting the empty fuse-case.

It is obvious that the construction and arrangement of the parts can be somewhat modified without departing from the nature of my said invention.

What I claim is—

1. In a breech-loading gun, the combination, with a breech-screw provided with interrupted or segmental screw-threads, of a screw-shaft fitted to rotate in bearings on the breech of the gun and connected with the said breech-screw by mechanism comprising a nut working on the said screw-shaft, a toothed wheel formed or fixed on the said nut and adapted to engage with the threads of the breech-screw, a sleeve mounted upon the said nut and provided with a rack, and a toothed segment on the breech-screw geared with the said rack, whereby the opening or closing of the breech will be effected by the simple rotation of the said screw-shaft in one or the other direction.

2. In breech-loading ordnance, the combination, with a breech-screw provided with interrupted or segmental screw-threads, of a toothed segment on the said breech-screw, a sleeve provided with a toothed rack geared with the said segment, a nut on which the said sleeve is mounted, a screw-shaft on which the said nut is fitted, and means, substantially such as above described, for rotating the said screw-shaft, substantially as and for the purposes set forth.

3. In breech-loading ordnance, the combination, with a breech-screw provided with interrupted or segmental screw-threads, of a toothed segment on the said breech-screw, a sleeve provided with a toothed rack geared with the said segment, a nut on which the said sleeve is mounted, a screw-shaft on which the said nut is fitted, a pinion on the said nut adapted to engage with the threads of the breech-screw, a pivoting or swiveling bracket for supporting the said breech-screw, and means, substantially such as above described, for rotating the said screw-shaft, substantially as and for the purposes set forth.

4. The combination, with the breech-screw B and a pivoting or swiveling bracket C for supporting the said breech-screw when out of the breech, of a toothed segment $a$, secured to the breech-screw, a sleeve $c$, provided with a rack $b$, geared with the said segment, a nut $d$, on which the said sleeve is mounted, a toothed wheel $e$, firmly attached to the said nut and formed with helical teeth to engage with the threads of the breech-screw, a screw-shaft $f$, working in the said nut, a worm-wheel $h$, fixed on the said shaft, a worm geared with the said worm-wheel, and means, substantially such as above described, for rotating the said worm, all substantially as and for the purposes set forth.

5. In breech-loading ordnance, the combination, with the breech-screw, the fixed stem, and the movable head, of a nozzle fixed in the said stem and having secured upon it a metal tube fitting into the central passage in the said movable head, substantially as and for the purposes set forth.

6. In breech-loading ordnance, the combination, with the breech-screw, of an automatic cocking device consisting of a bolt $n$, having a projection $n'$, a rim or collar $C^4$ of the bracket C, with which the said bolt engages, and having a notch or recess $C^5$, into which the said bolt will fall when the breech-screw is properly closed, and thus allow the firing mechanism to act, a hammer $p$, pivoted to the said bolt and provided with an extension $p^3$, a fixed stop $s$ in the breech-screw, and a spring $q^2$ for acting on the said hammer, all substantially as and for the purposes set forth.

7. In breech-loading ordnance, the combination, with the breech-screw, of an automatic extracting device, consisting of a bolt $n$, having a stud or projection $n^3$, and an extractor $r$, which is pivoted to the breech-screw, and one arm of which extends into the path of the said stud or projection $n^3$, the other arm of the said extractor engaging with the fuse-case, all substantially as and for the purposes set forth.

In testimony whereof I have hereunto signed my name in the presence of two subscribing witnesses.

JEAN BAPTISTE GUSTAVE ADOLPHE CANET.

Witnesses:
R. J. PRESTON,
JOHN H. R. WHINFIELD.